(12) United States Patent
Lee et al.

(10) Patent No.: US 12,431,575 B2
(45) Date of Patent: Sep. 30, 2025

(54) BATTERY PACK HAVING IMPROVED FASTENING STRUCTURE AND VEHICLE COMPRISING SAME

(71) Applicant: LG ENERGY SOLUTION, LTD., Seoul (KR)

(72) Inventors: Jung-Hoon Lee, Daejeon (KR); Doo-Han Yoon, Daejeon (KR); Jae-Hun Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 275 days.

(21) Appl. No.: 17/766,985

(22) PCT Filed: Oct. 26, 2020

(86) PCT No.: PCT/KR2020/014681
§ 371 (c)(1),
(2) Date: Apr. 6, 2022

(87) PCT Pub. No.: WO2021/137403
PCT Pub. Date: Jul. 8, 2021

(65) Prior Publication Data
US 2024/0079704 A1    Mar. 7, 2024

(30) Foreign Application Priority Data
Jan. 3, 2020 (KR) .................. 10-2020-0000994

(51) Int. Cl.
*H01M 50/262* (2021.01)
*H01M 10/42* (2006.01)
(Continued)

(52) U.S. Cl.
CPC ....... *H01M 50/262* (2021.01); *H01M 50/244* (2021.01); *H01M 50/249* (2021.01);
(Continued)

(58) Field of Classification Search
CPC ............. H01M 50/204; H01M 50/244; H01M 50/262; H01M 50/264; H01M 50/271; H01M 50/289; H01M 50/567
See application file for complete search history.

(56) References Cited

U.S. PATENT DOCUMENTS

2005/0053828 A1    3/2005  Komura et al.
2006/0246350 A1   11/2006  Takayama et al.
(Continued)

FOREIGN PATENT DOCUMENTS

CN    204857805 U    12/2015
JP     5-71523 A     3/1993
(Continued)

OTHER PUBLICATIONS

International Search Report for PCT/KR2020/014681 (PCT/ISA/210) mailed on Feb. 1, 2021.

*Primary Examiner* — Imran Akram
(74) *Attorney, Agent, or Firm* — Birch, Stewart, Kolasch & Birch, LLP

(57) ABSTRACT

A battery pack includes a module stack in which a plurality of battery modules are stacked; a pack housing having a lower housing for supporting the module stack at a lower side thereof and an upper housing coupled to the lower housing from an upper side of the module stack; a plurality of weld nuts fixed to a lower surface of the lower housing; and a plurality of fastening bolts fastened to the weld nuts through the pack housing and the module stack.

11 Claims, 8 Drawing Sheets

(51) Int. Cl.
*H01M 50/24* (2021.01)
*H01M 50/244* (2021.01)
*H01M 50/249* (2021.01)
*H01M 50/289* (2021.01)

(52) U.S. Cl.
CPC .. *H01M 50/289* (2021.01); *H01M 2010/4271* (2013.01); *H01M 50/24* (2021.01); *H01M 2220/20* (2013.01)

(56) References Cited

U.S. PATENT DOCUMENTS

| | | |
|---|---|---|
| 2011/0129727 A1 | 6/2011 | Ahn et al. |
| 2012/0301763 A1 | 11/2012 | Tonomura et al. |
| 2014/0284125 A1 | 9/2014 | Katayama et al. |
| 2015/0349389 A1* | 12/2015 | Kobune ............... B60L 3/0046 429/90 |
| 2016/0372736 A1 | 12/2016 | Kim et al. |
| 2017/0279172 A1 | 9/2017 | Tucker |
| 2018/0053921 A1* | 2/2018 | Kim ................... H01M 10/058 |
| 2020/0168879 A1 | 5/2020 | Kim et al. |
| 2020/0280035 A1 | 9/2020 | Park et al. |

FOREIGN PATENT DOCUMENTS

| | | |
|---|---|---|
| JP | 2006-313733 A | 11/2006 |
| JP | 2007-18751 A | 1/2007 |
| JP | 2007-286834 A | 11/2007 |
| JP | 2011-171176 A | 9/2011 |
| JP | 2013-105617 A | 5/2013 |
| JP | 2015-191763 A | 11/2015 |
| JP | 2017-73400 A | 4/2017 |
| JP | 2017-174792 A | 9/2017 |
| JP | 2018-123355 A | 7/2019 |
| KR | 20-0379623 Y1 | 3/2005 |
| KR | 10-2011-0061055 A | 6/2011 |
| KR | 10-2012-0081821 A | 7/2012 |
| KR | 10-2015-0140120 A | 12/2015 |
| KR | 10-1948180 B1 | 2/2019 |
| KR | 10-2019-0064839 A | 6/2019 |
| KR | 10-2019-0118017 A | 10/2019 |
| WO | WO 2013/073464 A1 | 5/2013 |

* cited by examiner

BATTERY PACK HAVING IMPROVED FASTENING STRUCTURE AND VEHICLE COMPRISING SAME

TECHNICAL FIELD

The present disclosure relates to a battery pack having an improved fastening structure and a vehicle including the same, and more specifically, to a battery pack that may increase connection reliability, reduce costs and prevent moisture penetration through a fastening portion at an outer side of a pack housing by fastening a module stack and the pack housing together using a bolt, and a vehicle including the same.

The present application claims priority to Korean Patent Application No. 10-2020-0000994 filed on Jan. 3, 2020 in the Republic of Korea, the disclosures of which are incorporated herein by reference.

BACKGROUND ART

A secondary battery easily applicable to various product groups and having electric characteristics such as high energy density is universally applied not only to portable devices but also to electric vehicles (EV) or hybrid electric vehicles (HEV) driven by an electric drive source. Such a secondary battery is attracting attention as a new energy source for environmental friendliness and energy efficiency improvement in that it does not generate by-products from the use of energy along with a primary advantage of dramatically reducing the use of fossil fuels.

Types of secondary batteries currently widely used in the art include lithium ion batteries, lithium polymer batteries, nickel cadmium batteries, nickel hydride batteries, nickel zinc batteries, and the like. The operating voltage of such a unit secondary battery cell, namely a unit battery cell, is about 2.5V to 4.5V. Therefore, if a higher output voltage is required, a battery pack may be configured by connecting a plurality of battery cells in series. In addition, the battery pack may be configured by connecting a plurality of battery cells in parallel according to the charge/discharge capacity demanded for the battery pack. Accordingly, the number of battery cells included in the battery pack may be variously set according to a required output voltage or charge/discharge capacity.

Meanwhile, when configuring a battery pack by connecting a plurality of battery cells in series/parallel, generally, a battery module including a plurality of battery cells is configured first, and a module stack formed by stacking a plurality of such battery modules is accommodated in a pack housing to configure the battery pack.

Accordingly, there is a need to reduce component cost and improve structural reliability by developing a battery pack having a structure in which the connection between a plurality of battery modules and between the module stack and the pack housing may be made as simple as possible.

DISCLOSURE

Technical Problem

The present disclosure is designed to solve the problems of the related art, and therefore the present disclosure is directed to reducing components, simplifying the process, increasing energy density and improving structural reliability by allowing the fastening between a plurality of battery modules and between a module stack formed by stacking a plurality of battery modules and a pack housing to be made as simple as possible.

However, the technical problem to be solved by the present disclosure is not limited to the above, and other problems not mentioned herein will be clearly understood by those skilled in the art from the following description.

Technical Solution

In one aspect of the present disclosure, there is provided a battery pack, comprising: a module stack in which a plurality of battery modules are stacked; a pack housing having a lower housing configured to support the module stack at a lower side thereof and an upper housing coupled to the lower housing from an upper side of the module stack; a plurality of weld nuts fixed to a lower surface of the lower housing; and a plurality of fastening bolts fastened to the weld nuts through the pack housing and the module stack.

The lower housing may include a lower housing body configured to provide an accommodation space for the module stack; and an airtight plate assembly attached to a lower surface of the lower housing body and configured to provide an accommodation space for the weld nut.

The airtight plate assembly may include a gasket configured to cover the weld nut; and an airtight plate configured to press the gasket and being attached to the lower surface of the lower housing.

The airtight plate may have a double step structure provided with the accommodation space for accommodating the gasket and the weld nut.

An attachment groove may be formed at the lower surface of the lower housing body so that the airtight plate assembly is attached thereto.

A depth of the attachment groove may be equal to or greater than a height of a step of the airtight plate.

A head portion of the fastening bolt may be coated with a sealing member.

The battery module may include a unit module stack formed by coupling a plurality of unit modules; and a battery management system (BMS) assembly coupled to one longitudinal side of the unit module stack.

The BMS assembly may have a plurality of first fastening holes formed along a height direction thereof, and the unit module may have a plurality of second fastening holes formed at one longitudinal side thereof and a plurality of third fastening holes formed at the other longitudinal side thereof.

Among the plurality of fastening bolts, a first fastening bolt passes through a first first fastening hole among the plurality of first fastening holes and a first second fastening hole among the plurality of second fastening holes, which overlap each other, and a second fastening bolt passes through a second second through hole among the plurality of second fastening holes and a first third fastening hole among the plurality of third fastening holes, which overlap each other, so that the pack housing, the BMS assembly and the unit module stack are coupled at once.

The unit module may have a structure in which a plurality of cell groups, each having a plurality of battery cells arranged in a longitudinal direction of the unit cell, are arranged along a width direction of the unit module, and wherein the third fastening holes may be formed in a dead space created as neighboring cell groups are disposed so as to shift from each other.

Meanwhile, in another aspect of the present disclosure, there is also provided a vehicle, comprising the battery pack according to an embodiment of the present disclosure.

Advantageous Effects

According to an embodiment of the present disclosure, it is possible to reduce components, simplify the process, increase energy density and improve structural reliability by allowing the fastening between a plurality of battery modules and between a module stack formed by stacking a plurality of battery modules and a pack housing to be made as simple as possible.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a schematic structure of a battery pack 1 according to an embodiment of the present disclosure will be described with reference to FIGS. 1 to 4.

Referring to FIGS. 1 to 4, the battery pack 1 according to an embodiment of the present disclosure includes a module stack M, a pack housing 200, a plurality of fastening bolts 300, and a plurality of weld nuts 400.

Figure 2:
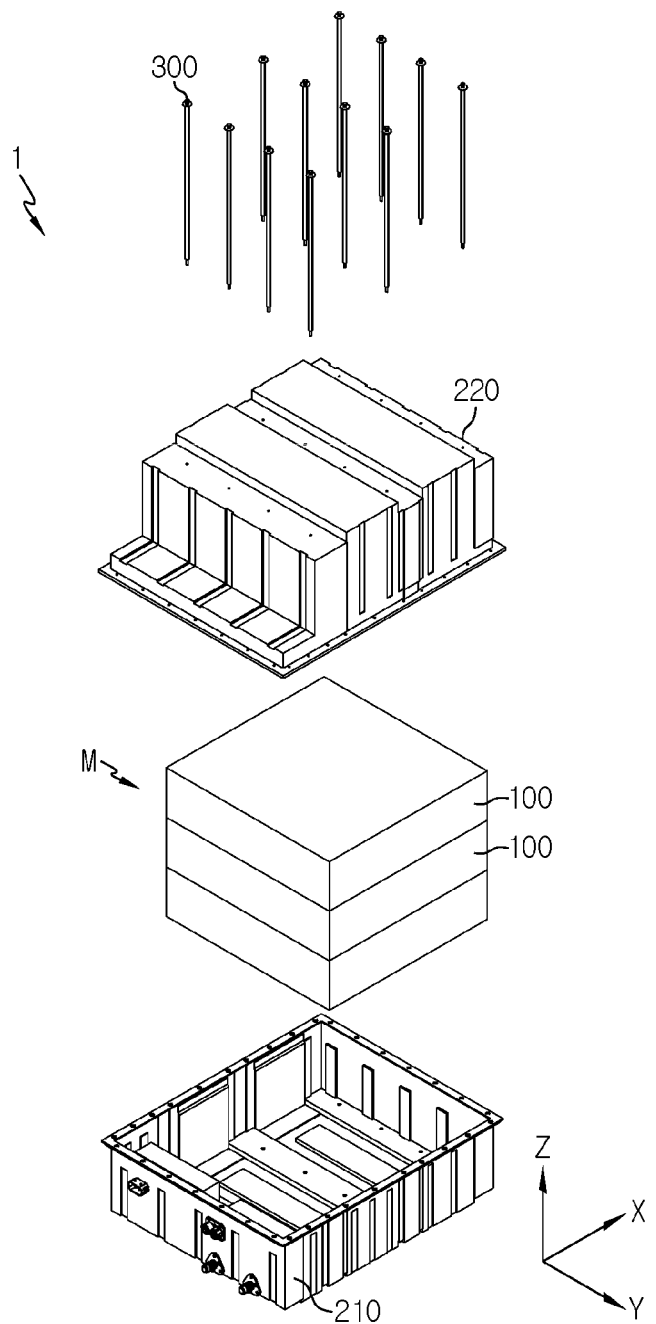
FIG. 2 is an exploded perspective view showing the battery pack of FIG. 1.
Figure 3:
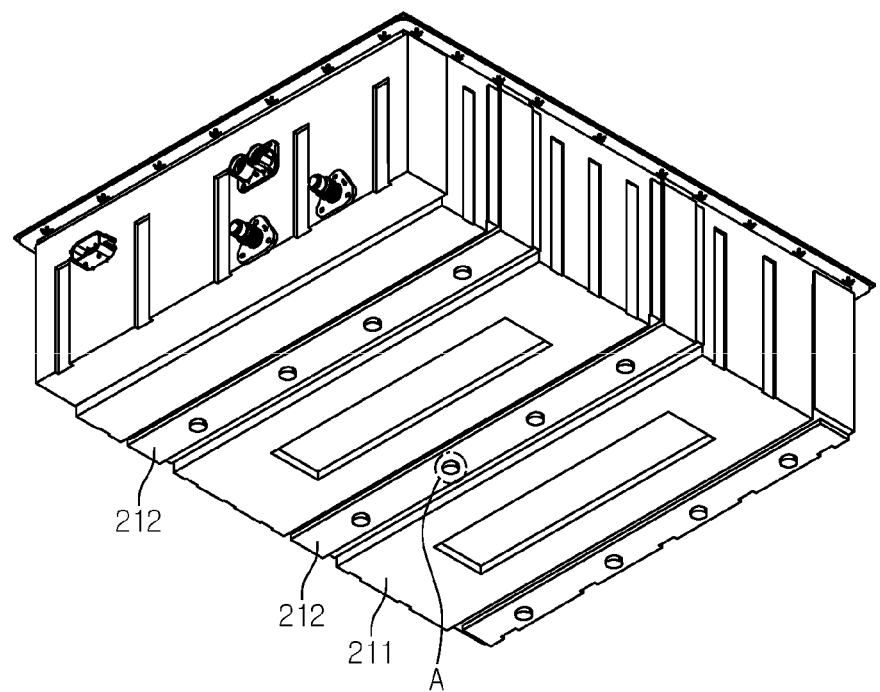
FIG. 3 is a diagram in which a lower surface of a pack housing applied to the battery pack depicted in FIG. 1 is shown well.

As shown in FIG. 2, the module stack M has a form in which a plurality of battery modules 100 are stacked. A detailed structure of each battery module 100 will be described later with reference to FIGS. 5 and 6.

As shown in FIG. 2, the pack housing 200 includes a lower housing 210 for supporting a lower portion of the module stack M and an upper housing 220 for covering an upper portion of the module stack M and coupled to the lower housing 210. The lower housing 210 has a special structure on its lower surface, and the special structure of the lower housing 210 will be described in detail later.

Figure 1:
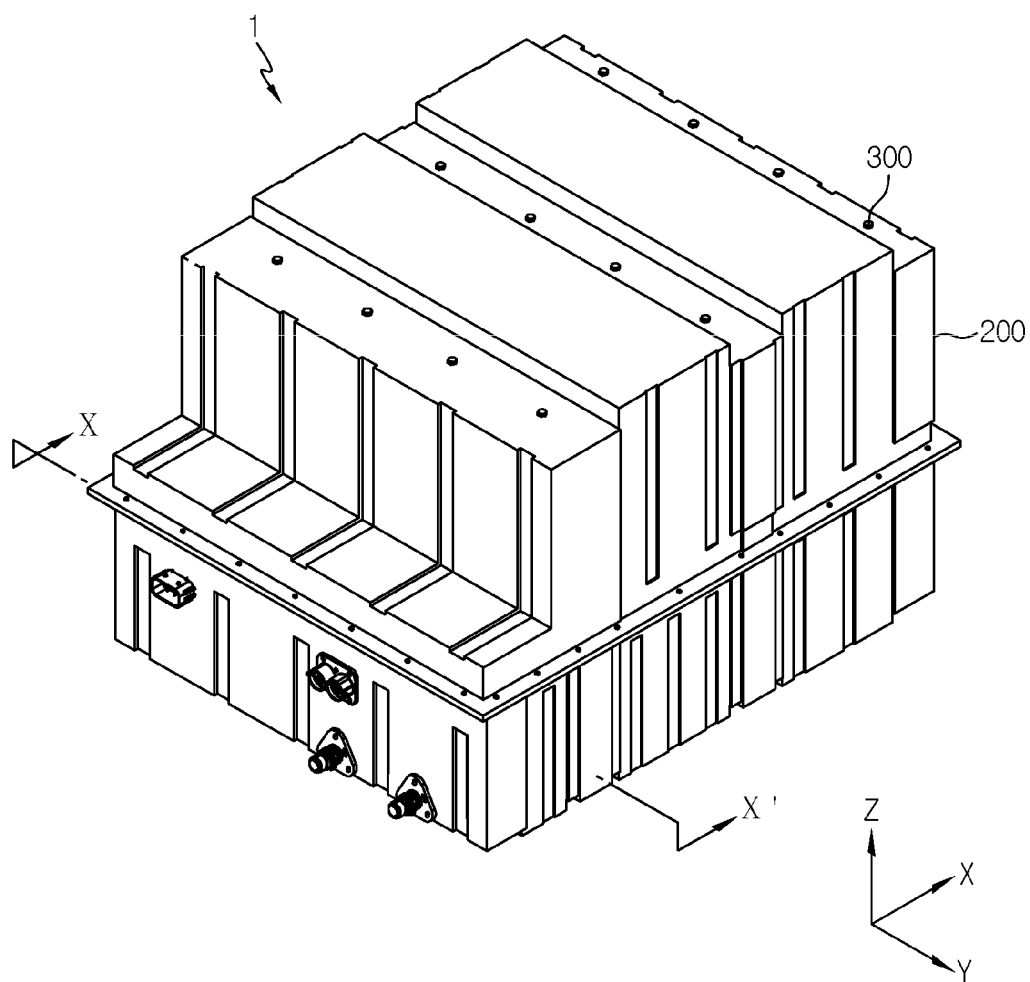
FIG. 1 is a perspective view showing a battery pack according to an embodiment of the present disclosure.

As shown in FIGS. 1 and 2, the plurality of fastening bolts 300 have a shape of a long bolt, and may pass through the upper housing 220, the module stack M and the lower housing 210 in sequence so that the module stack M is fixed to the pack housing 200.

Figure 4:
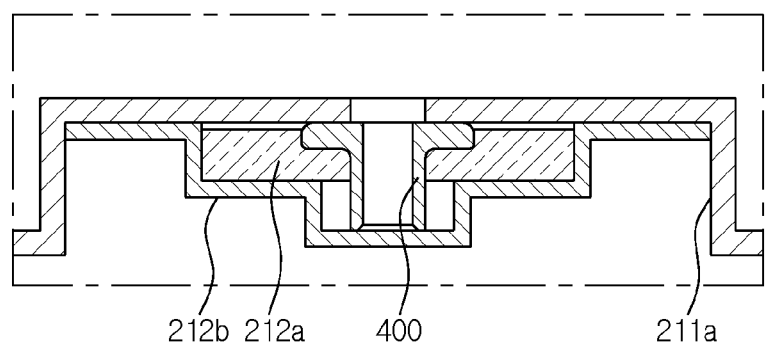
FIG. 4 is a diagram showing an inner structure of a region A of FIG. 3.

As shown in FIG. 4, the weld nut 400 is attached to a bottom surface of the lower housing 210 (see FIGS. 2 and 3) by welding. The weld nut 400 is attached at a position corresponding to a through hole formed in the bottom surface of the lower housing 210 so as to be coupled with the fastening bolt 300. In addition, the weld nut 400 is located inside a gasket 210a and an airtight plate 210b provided to the lower housing 210. The weld nut 400 is located inside the gasket 210a and the airtight plate 210b as above in order to prevent external foreign matter or moisture from penetrating into the inside of the pack housing 200 due to the through hole formed in the lower housing 210 and thus reducing the lifespan of the battery pack 1 or deteriorating the performance of the battery pack 1.

Next, the battery module 100 of the module stack M applied to the present disclosure will be described in detail with reference to FIGS. 5 and 6 along with FIG. 2.

Figure 5:
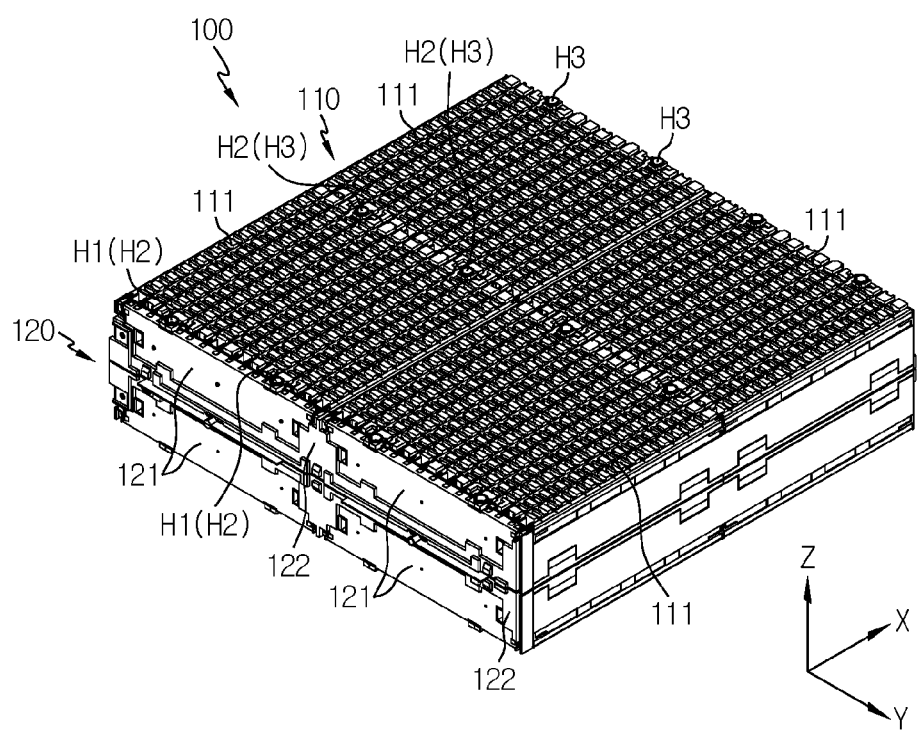
FIG. 5 is a diagram showing a battery module applied to the battery pack of FIG. 1, from which a module housing is removed.

The battery module 100 shown in FIG. 5 is in a state where an outer cover, namely a module housing of the battery module 100 shown in FIG. 2, is removed. That is, the battery module 100 shown in FIG. 5 and the battery module 100 shown in FIG. 2 have a difference in the presence/absence of a module housing, but for convenience of explanation, the same reference numerals are applied.

Figure 6:
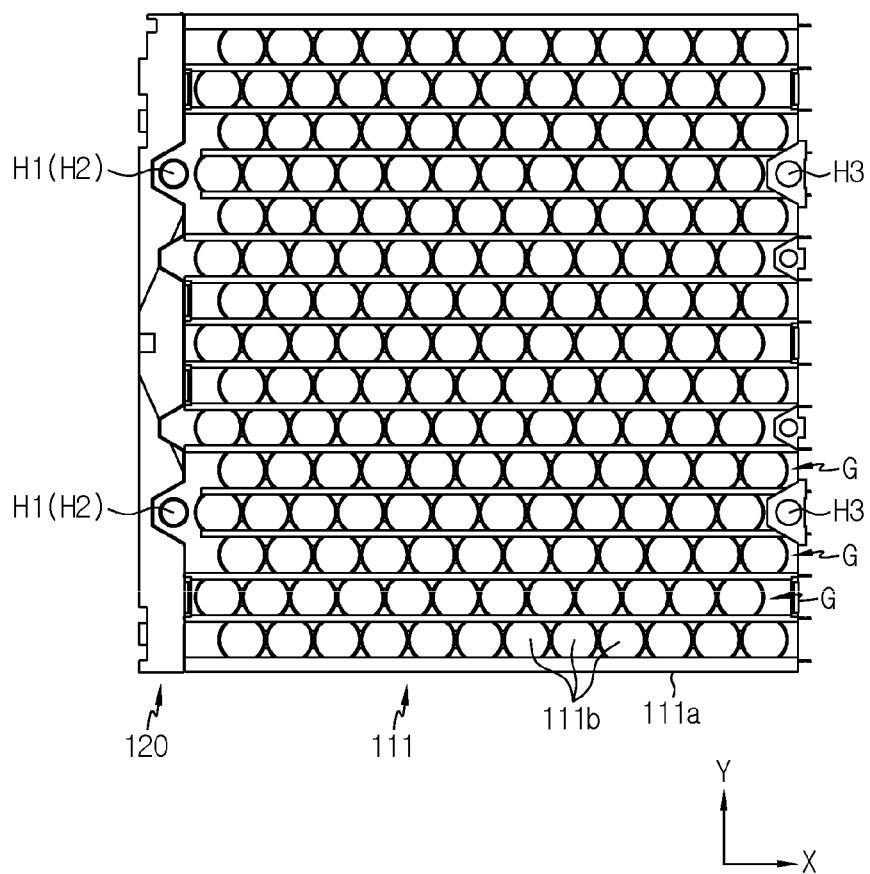
FIG. 6 is a diagram in which a battery cell accommodated in a cell housing is shown well, in the battery module of FIG. 5.
Figure 7:
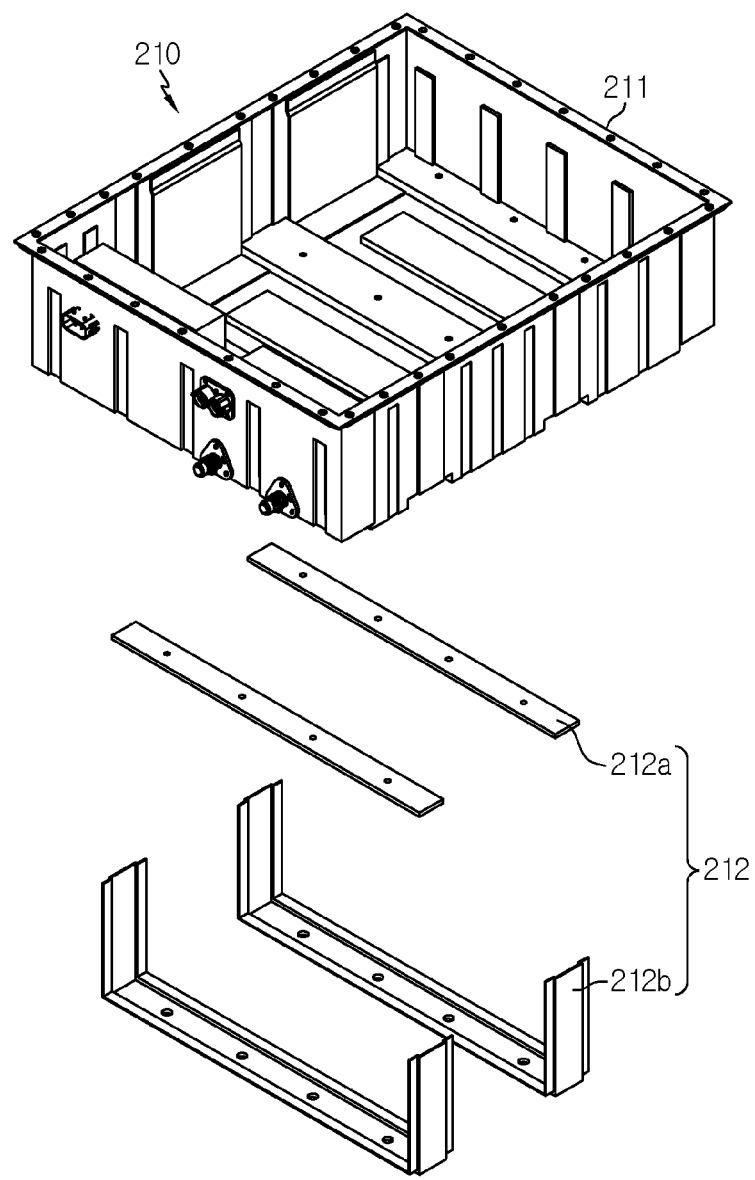
FIG. 7 is an exploded perspective view showing a lower housing employed at the pack housing applied to the present disclosure.
Figure 8:
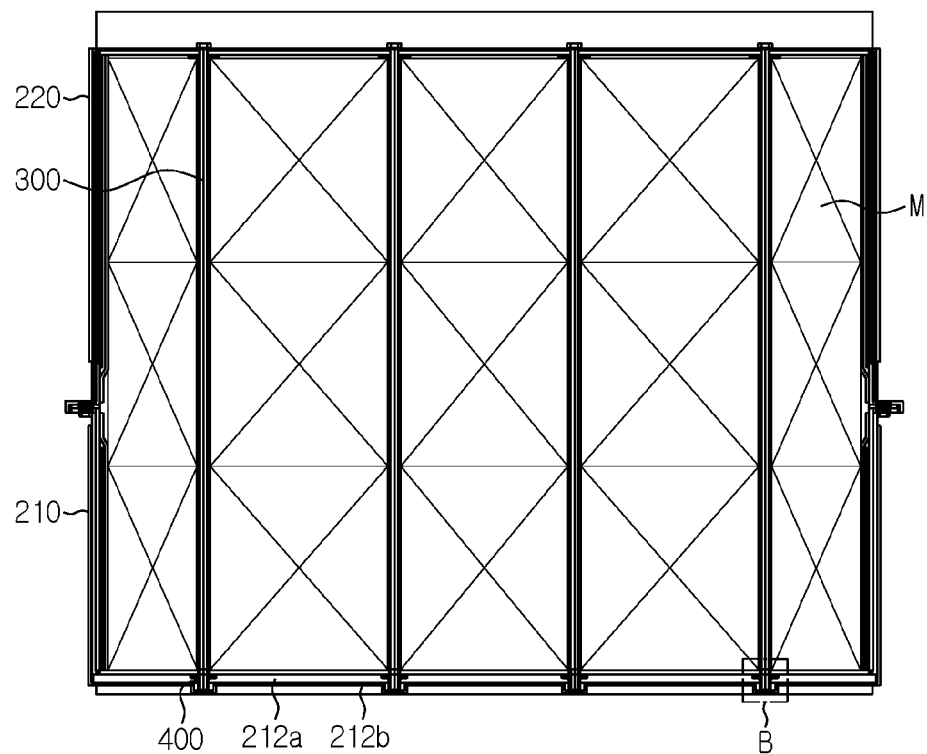
FIG. 8 is a sectional view, taken along the line X-X of FIG. 1.
Figure 9:
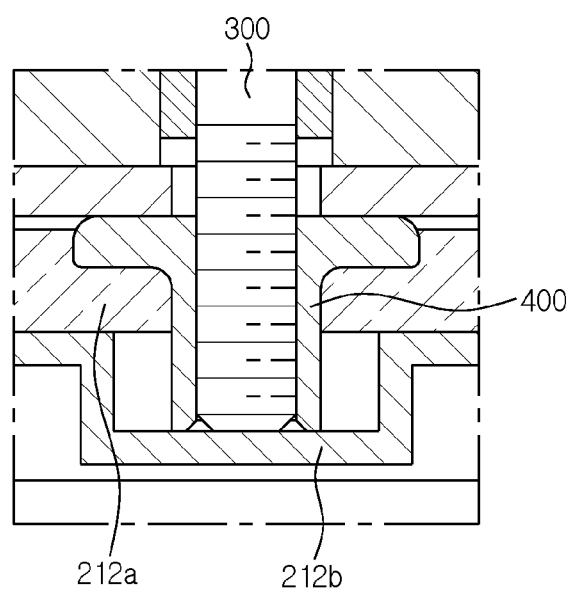
FIG. 9 is an enlarged view showing a region B of FIG. 8.

Referring to FIGS. 5 and 6, the battery module 100 includes is a unit module stack 110 formed by coupling a plurality of unit modules 111 and a BMS assembly 120 coupled at one end of the module stack 110 in a longitudinal direction (a direction parallel to the X axis in FIG. 5).

The unit module 111 includes a cell housing 111a and a plurality of battery cells 111b accommodated in the cell housing 111a and electrically connected to each other. The battery cell 111b may employ, for example, a cylindrical battery cell.

The BMS assembly 120 includes a plurality of BMSs (battery management systems) 121 and a BMS frame 122 for surrounding and fixing the BMSs 121. Each BMS 121 is electrically connected to the unit module 111 and may serve as a slave BMS. That is, the plurality of BMSs 121 may be connected to a separate master BMS (not shown).

The battery module 100 has a plurality of fastening holes H1 to H3 through which the fastening bolts 300 (see FIGS. 1 and 2) may pass. Specifically, the BMS frame 122 includes a plurality of first fastening holes H1 spaced apart from each other along a width direction of the battery module 100 (a direction parallel to the Y axis of FIG. 5). In addition, the unit module 111 has a plurality of second fastening holes H2 formed at one end of the unit module 111 in the longitudinal direction (a direction parallel to the X axis in FIG. 5) and spaced apart from each other along the width direction of the unit module 111 (a direction parallel to the Y axis in FIG. 5). The second fastening hole H2 is formed in the cell housing 111a of the unit module 111. That is, the second fastening hole H2 is formed in a surplus space of the cell housing 111a other than the accommodation space for the battery cells 111b. When the unit module stack 110 and the BMS assembly 120 are assembled to form the battery module 100, the first fastening hole H1 and the second fastening hole H2 overlap each other. Therefore, the fastening bolt 300 passes through the first fastening hole H1 and the second fastening hole H2 at the same time, and thus the unit module stack 110, the BMS assembly 120 and the pack housing 200 are coupled at once.

In addition, the unit module 111 has a plurality of third fastening holes H3 formed at the other end of the unit module 111 in the longitudinal direction (a direction parallel to the X axis in FIG. 5) and spaced apart from each other along the width direction of the unit module 111 (a direction parallel to the Y axis in FIG. 5). The third fastening hole H3 is formed in the cell housing 111a of the unit module 111. That is, the third fastening hole H3 is formed in a surplus space of the cell housing 111a other than the accommodation space for the battery cells 111b. When the unit module 111 and the unit module 111 are assembled to form the unit module stack 110, the second fastening hole H2 and the third fastening hole H3 overlap each other. Therefore, the fastening bolt 300 passes through the second fastening hole H2 and the third fastening hole H3 at the same time, and thus the unit module stack 110 and the pack housing 200 are coupled at once.

Meanwhile, referring to FIG. 6, the third fastening hole H3 formed at one of both sides of the battery module 100 in the longitudinal direction (a direction parallel to the X axis in FIG. 6), which is opposite to a side where the BMS assembly 120 is coupled, is formed using a dead space created as neighboring cell groups G are disposed so as to shift from each other. That is, the unit module 111 has a structure in which a plurality of cell groups G, each having a plurality of battery cells 111b arranged along the longitudinal direction of the unit module 111 (a direction parallel to the X axis in FIG. 6), are arranged in the width direction of the unit module 111 (a direction parallel to the Y axis in FIG. 6), and the third fastening hole H3 is formed in the dead space created as the neighboring cell groups G are disposed so as to shift from each other. Since the third fastening hole H3 is formed using the dead space as described above, energy density loss caused by forming the third fastening hole H3 may be prevented.

Next, referring to FIGS. 7 to 10 along with FIG. 4, a fastening structure using an airtight plate assembly 212, a fastening bolt 300 and a weld nut 400 applied to the battery pack 1 according to an embodiment of the present disclosure and the resultant effect of improved fastening and airtightness will be described in detail.

First, referring to FIGS. 7 to 10 along with FIG. 4, the lower housing 210 includes a lower housing body 211 and an airtight plate assembly 212. The airtight plate assembly 212 is inserted into an attachment groove 211a formed at a lower surface of the lower housing body 211, and is fixed to an inner bottom surface of the attachment groove 211a by welding or the like.

The airtight plate assembly 212 includes a gasket 212a and an airtight plate 212b. The gasket 212a surrounds the periphery of the weld nut 400 attached by welding to the lower surface of the lower housing body 211 and is interposed between the weld nut 400 and the airtight plate 212b to prevent foreign matter or moisture from penetrating into the gap between the weld nut 400 and the bottom surface of the lower housing body 211. The airtight plate 212b covers the gasket 212a and the weld nut 400 inside the attachment groove 211a and is fixed to the bottom surface of the lower housing body 211 by welding or the like to primarily prevent foreign matter and/or moisture from penetrating.

The airtight plate 212b presses the gasket 212a and is attached to the lower surface of the lower housing 210, namely to the bottom surface of the lower housing body 211. In addition, the airtight plate 212b may have a double step structure provided with a space in which the gasket 212a may be accommodated and a space in which the weld nut 400 may be accommodated. However, the depth of the attachment groove 211a is preferably equal to or greater than the height of the airtight plate 212b according to the double step structure. This is to prevent energy density loss caused by the formation of the airtight plate 212b.

Figure 10:
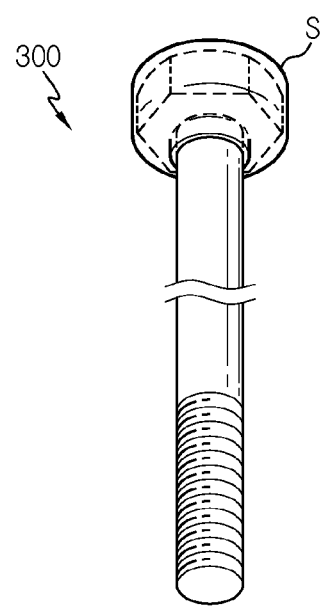
FIG. 10 is a diagram showing a fastening bolt applied to the present disclosure.

Meanwhile, referring to FIG. 10, the fastening bolt 300 may have a sealing member S coated on the surface of a head portion thereof in order to minimize the penetration of foreign matter and/or moisture through the hole formed in the upper portion of the pack housing 200, namely the through hole formed in the upper housing 220. The sealing member S may employ a material with elasticity, for example a urethane material.

Since the battery pack 1 according to an embodiment of the present disclosure has a structure capable of fastening each component of the module stack M and the pack housing 200 together by using the weld nut 400 fixed in advance to the pack housing 200 and the fastening bolt 300 fastened to the weld nut 400 through the pack housing 200 and the module stack M at once, it is possible to improve fastening reliability and reduce costs.

In addition, since the battery pack 1 according to an embodiment of the present disclosure has a structure that prevents external foreign matter and/or moisture from penetrating through the hole formed at the outer side of the pack housing 200, it is possible to reduce the fear of performance degradation during use of the battery pack.

Meanwhile, a vehicle according to an embodiment of the present disclosure includes the battery pack according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
   a module stack in which a plurality of battery modules are stacked;
   a pack housing having a lower housing configured to support the module stack at a lower side thereof and an upper housing coupled to the lower housing from an upper side of the module stack;
   a plurality of weld nuts fixed to a lower surface of the lower housing; and
   a plurality of fastening bolts fastened to the weld nuts through the pack housing and the module stack,
   wherein the lower housing includes:
   a lower housing body configured to provide an accommodation space for the module stack; and an airtight plate assembly attached to the lower surface of the lower housing body and configured to provide an accommodation space for the weld nut,
wherein the airtight plate assembly has a strip shape that is arranged to extend from a first end of the lower housing body to a second end of the lower housing body that is opposite to the first end, and
wherein the airtight plate assembly includes:
a gasket configured to cover the weld nut; and
an airtight plate configured to press the gasket and the nut against the lower surface of the lower housing and being attached to the lower surface of the lower housing.

2. The battery pack according to claim 1,
wherein the airtight plate has a double step structure provided with the accommodation space for accommodating the gasket and the weld nut.

3. The battery pack according to claim 2,
wherein an attachment groove is formed at the lower surface of the lower housing body so that the airtight plate assembly is inserted into the attachment groove and attached thereto.

4. The battery pack according to claim 3,
wherein a depth of the attachment groove is equal to or greater than a height of a step of the airtight plate.

5. The battery pack according to claim 1,
wherein a head portion of the fastening bolt is coated with a sealing member.

6. The battery pack according to claim 1,
wherein the battery module includes:
a unit module stack formed by coupling a plurality of unit modules; and
a battery management system (BMS) assembly coupled to one longitudinal side of the unit module stack.

7. The battery pack according to claim 6,
wherein the BMS assembly has a plurality of first fastening holes formed along a height direction thereof, and
wherein the unit module has a plurality of second fastening holes formed at one longitudinal side thereof and a plurality of third fastening holes formed at the other longitudinal side thereof.

8. The battery pack according to claim 7,
wherein among the plurality of fastening bolts, a first fastening bolt passes through a first first fastening hole among the plurality of first fastening holes and a first second fastening hole among the plurality of second fastening holes, which overlap each other, and a second fastening bolt passes through a second second through hole among the plurality of second fastening holes and a first third fastening hole among the plurality of third fastening holes, which overlap each other so that the pack housing, the BMS assembly and the unit module stack are coupled at once.

9. The battery pack according to claim 8,
wherein the unit module has a structure in which a plurality of cell groups, each having a plurality of battery cells arranged in a longitudinal direction of the unit cell, are arranged along a width direction of the unit module, and
wherein the third fastening holes are s formed in a dead space created as neighboring cell groups are disposed so as to shift from each other.

10. A vehicle, comprising the battery pack according to claim 1.

11. The battery pack according to claim 1, wherein the gasket has a strip shape that is arranged to extend from the first end of the lower housing body to the second end of the lower housing body that is opposite to the first end.

* * * * *